US010783261B1

United States Patent
Gu et al.

(10) Patent No.: US 10,783,261 B1
(45) Date of Patent: Sep. 22, 2020

(54) SYSTEMS AND METHODS FOR PREVENTING SENSITIVE INFORMATION EXPOSURE BASED ON A SURROUNDING AUDIENCE

(71) Applicant: Symantec Corporation, Mountain View, CA (US)

(72) Inventors: Lei Gu, Bedford, MA (US); Ilya Sokolov, Boston, MA (US)

(73) Assignee: NortonLifeLock Inc., Tempe, AZ (US)

( * ) Notice: Subject to any disclaimer, the term of this patent is extended or adjusted under 35 U.S.C. 154(b) by 220 days.

(21) Appl. No.: 15/981,266

(22) Filed: May 16, 2018

(51) Int. Cl.
 *G06F 21/60* (2013.01)
 *G06K 9/00* (2006.01)
 *H04L 29/06* (2006.01)

(52) U.S. Cl.
 CPC ....... *G06F 21/606* (2013.01); *G06K 9/00288* (2013.01); *H04L 63/0861* (2013.01); *H04L 63/102* (2013.01)

(58) Field of Classification Search
 CPC ........ H04W 24/00; G06F 3/0484; G06F 3/00; G06F 17/30; G06F 11/00; G06F 21/00; G06F 21/45; G06F 21/606; G08B 23/00; H04H 60/56; G06Q 30/00; G06K 9/00288; H04L 63/0861; H04L 63/102
 See application file for complete search history.

(56) References Cited

U.S. PATENT DOCUMENTS

| 7,512,889 B2 * | 3/2009 | Newell ................. G06F 1/163 706/45 |
| 8,429,745 B1 * | 4/2013 | Casaburi ............. G06F 21/6254 726/22 |
| 8,487,772 B1 * | 7/2013 | Higgins ............. G06Q 30/0201 340/573.1 |
| 9,137,558 B2 * | 9/2015 | Gibbon ................. H04H 60/45 |
| 2015/0033305 A1 * | 1/2015 | Shear ................... G06F 21/575 726/6 |
| 2016/0011729 A1 * | 1/2016 | Flores .................. G06F 3/167 715/728 |

* cited by examiner

*Primary Examiner* — Thanhnga B Truong
(74) *Attorney, Agent, or Firm* — FisherBroyles, LLP (57) ABSTRACT

The disclosed computer-implemented method for preventing sensitive information exposure based on a surrounding audience may include (1) detecting, from one or more communication devices, surrounding audience data associated with an audience presentation on a presentation device, the audience presentation including sensitive information and non-sensitive information, (2) determining an audience profile based on the surrounding audience data, the audience profile identifying one or more unintended audience members in the surrounding audience, (3) assigning an information exposure policy to the audience presentation based on the audience profile, and (4) performing a security action to enforce the information exposure policy on the presentation device such that the sensitive information is prevented from being exposed to the surrounding audience during the audience presentation. Various other methods, systems, and computer-readable media are also disclosed.

20 Claims, 7 Drawing Sheets

SYSTEMS AND METHODS FOR PREVENTING SENSITIVE INFORMATION EXPOSURE BASED ON A SURROUNDING AUDIENCE

BACKGROUND

Enterprise and consumer presentation technologies are often utilized to facilitate the sharing of information to a wide variety of audiences. In some instances, information shared during a presentation may include sensitive or confidential information only intended for certain members of an audience. For example, a company financial officer may present a report including quarterly results and projections intended for company board members in a meeting room that may be locally accessible by other company employees or outside vendors (e.g., technical support, food delivery personnel, etc.) and remotely accessible by security cameras or other remote monitoring devices. As another example, a presenter giving a company-wide presentation from their laptop may receive an e-mail notification or chat window popup revealing sensitive information (e.g., a pending merger/acquisition) only intended to be viewed by the presenter. As a result, sensitive or confidential information disclosed during a presentation utilizing traditional presentation technologies can be accidentally or unintentionally leaked outside of an enterprise or consumer environment to unintended audience members (in some cases, without the presenter even realizing it).

While conventional technologies exist to enforce data loss prevention solutions for sensitive or confidential documents transferred outside of enterprise and/or home environments, these technologies fail to prevent sensitive information from being exposed when being shared with a live audience during a presentation.

SUMMARY

As will be described in greater detail below, the instant disclosure describes various systems and methods for preventing sensitive information exposure based on a surrounding audience.

In one example, a computer-implemented method for preventing sensitive information exposure based on a surrounding audience may include (1) detecting, by a computing device, from one or more communication devices, surrounding audience data associated with an audience presentation on a presentation device, the audience presentation including sensitive information and non-sensitive information, (2) determining, by the computing device, an audience profile based on the surrounding audience data, the audience profile identifying one or more unintended audience members in the surrounding audience, (3) assigning, by the computing device, an information exposure policy to the audience presentation based on the audience profile, and (4) performing, by the computing device, a security action to enforce the information exposure policy on the presentation device such that the sensitive information is prevented from being exposed to the surrounding audience during the audience presentation.

In some examples, the computer-implemented method may further include (1) receiving new surrounding audience data, (2) determining a change in the audience profile based on the new surrounding audience data, and (3) updating the information exposure policy based on the change in the audience profile. In some examples, the computing device may detect the surrounding audience data associated with the audience presentation on the presentation device by detecting at least one of (1) facial recognition data, (2) voice detection data, and (3) communication device data.

In some examples, the computing device may determine the audience profile based on the surrounding audience data by (1) identifying one or more categories associated with the surrounding audience data and (2) determining the audience profile based on the categories. In some examples, the categories may include (1) an age category, (2) an organization department category, (3) an organization clearance level category, (4) a communication device compliance level category, (5) a communication device application category, and/or (6) an information exposure capability category.

In some examples, the computing device may perform the security action to enforce the information exposure policy on the presentation device by obscuring the sensitive information. Additionally or alternatively, the computing device may perform the security action to enforce the information exposure policy on the presentation device by suppressing the sensitive information. In some examples, the computing device may suppress the sensitive information by (1) displaying a notification on the presentation device that the audience presentation contains the sensitive information, (2) generating a map showing members of the surrounding audience outside a proximity of the presentation device, and (3) preventing the audience presentation from being displayed by the presentation device. Additionally or alternatively, the computing device may suppress the sensitive information by displaying only the non-sensitive information during the audience presentation.

In some examples, the information exposure policy may include (1) a data loss prevention policy defined for a document associated with the audience presentation and/or (2) a parental control policy defined for age-based content associated with the audience presentation.

In one embodiment, a system for preventing sensitive information exposure based on a surrounding audience may include several modules stored in memory, including (1) a detection module that detects from one or more communication devices, surrounding audience data associated with an audience presentation on a presentation device, the surrounding audience data including sensitive information and non-sensitive information, (2) a determining module that determines an audience profile based on the surrounding audience data, the audience profile identifying one or more unintended audience members in the surrounding audience, (3) an assignment module that assigns an information exposure policy to the sensitive information based on the audience profile, (4) a security module that performs a security action to enforce the information exposure policy on the presentation device such that the sensitive information is prevented from being exposed to the surrounding audience during the audience presentation, and (5) at least one physical processor that executes the detection module, the determining module, the assignment module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect, by the computing device, from one or more communication devices, surrounding audience data associated with an audience presentation on a presentation device, the audience presentation including sensitive information and non-sensitive information, (2) determine, by the computing device, an audience profile based on the surrounding audience data, the audience profile identifying one or more unintended audience members in the surrounding audience, (3) assign, by the computing device, an information exposure policy to the audience presentation based on the audience profile, and (4) perform, by the computing device, a security action to enforce the information exposure policy on the presentation device such that the sensitive information is prevented from being exposed to the surrounding audience during the audience presentation.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for preventing sensitive information exposure based on a surrounding audience. As will be explained in greater detail below, by detecting data from communication devices associated with members of an audience during a presentation including sensitive information, the systems and methods described herein may be able to build an audience profile to identify audience members for whom the disclosure of the sensitive information is not intended and to further assign an information exposure policy (e.g., a data loss prevention policy or a parental control policy) to the presentation based on the audience profile. By utilizing the audience profile in this way, the systems and methods described herein may enable the use of the information exposure policy to prevent the disclosure of sensitive information to unintended audience members (e.g., non-company personnel or minor children) by suppressing or obscuring the sensitive information in presentation content being viewed by a surrounding audience. In addition, the systems and methods described herein may improve computer network security by preventing sensitive information (e.g., network e-mail addresses, user names, etc.), unintentionally leaked to malicious actors, that may be utilized to compromise the functioning of the computer network by making it vulnerable to attack using the leaked sensitive information.

Figure 1:
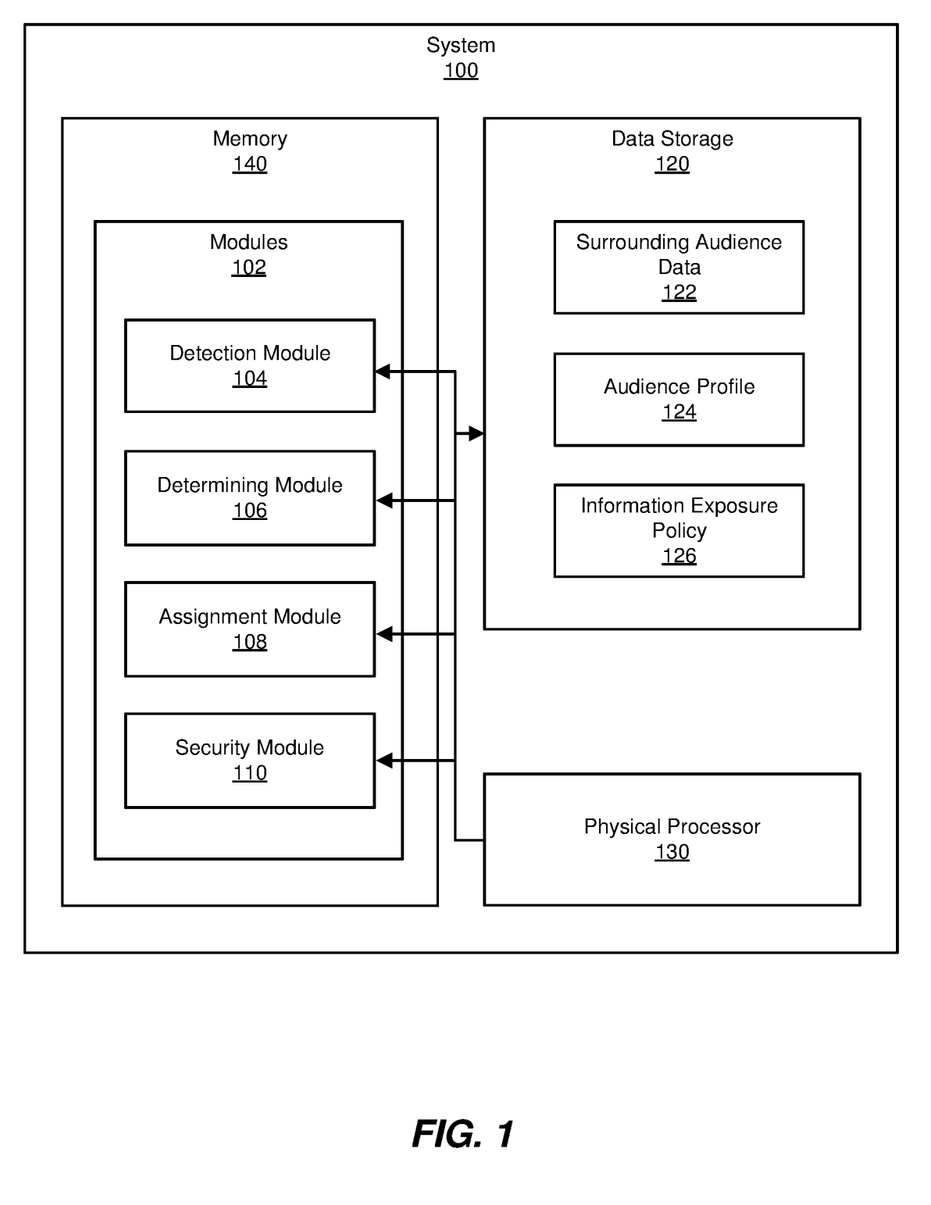
FIG. 1 is a block diagram of an example system for preventing sensitive information exposure based on a surrounding audience.
Figure 2:
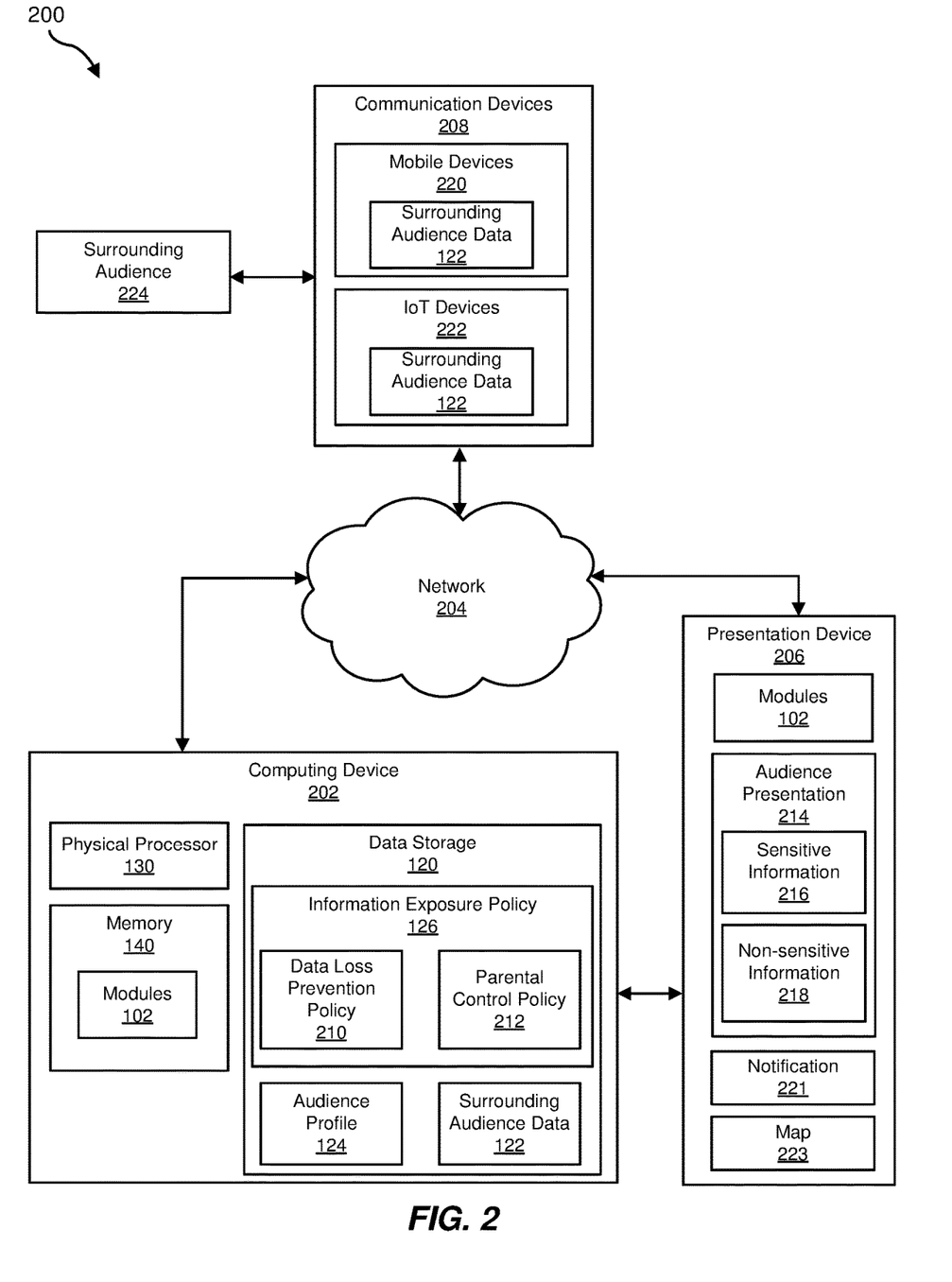
FIG. 2 is a block diagram of an additional example system for preventing sensitive information exposure based on a surrounding audience.

The following will provide, with reference to FIGS. 1-2, detailed descriptions of example systems for preventing sensitive information exposure based on a surrounding audience. Detailed descriptions of corresponding computer-implemented methods will also be provided in connection with FIG. 3. Detailed descriptions of surrounding audience data and an audience profile in the example systems of FIGS. 1-2 will also be provided in connection with FIG. 4. A detailed description of an information exposure policy being applied to sensitive information in the example systems of FIGS. 1-2 will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for preventing sensitive information exposure based on a surrounding audience. As illustrated in this figure, example system 100 may include one or more modules 102 for performing one or more tasks. As will be explained in greater detail below, modules 102 may include a detection module 104 that detects surrounding audience data 122 associated with an audience presentation, a determining module 106 that determines an audience profile 124 based on surrounding audience data 122, an assignment module 108 that assigns an information exposure policy 126 based on the audience profile 124, and a security module 110 that performs that performs a security action to enforce information exposure policy 126 such that the sensitive information is prevented from being exposed to a surrounding audience during an audience presentation. Although illustrated as separate elements, one or more of modules 102 in FIG. 1 may represent portions of a single module or application.

As used herein, the term "audience presentation" generally refers to any information or content shared with an audience utilizing a computing and/or display device. For example, in an enterprise setting, a presentation may include sensitive and/or non-sensitive company information shared with an audience (e.g., employees) as a series of slides utilizing slide presentation software running on a computing device during a meeting. Additionally or alternatively, the company information may be shared to employees via a video signal broadcast on a display device. As another example, in a consumer setting, a presentation may include sensitive and/or non-sensitive information shared with an audience (e.g., a family) via a video program broadcast on a consumer display device (e.g., a television or mobile electronic device).

As used herein, the term "sensitive information" generally refers to any information intended to be shared with a subset of a population capable of viewing an audience presentation. For example, sensitive information may include a company earnings report intended to be shared with board members during an audience presentation in a meeting room accessible by outside vendors and/or security cameras.

As used herein, the term "surrounding audience data" generally refers to communication data, received from one or more communication devices, that may be utilized to identify surrounding audience members (e.g., audience members capable of viewing a presentation) for building an audience profile. For example, surrounding audience data may include facial recognition data and/or voice detection data received from video cameras in a meeting room hosting audience members where an audience presentation is being given and/or audience members having remote viewing access (e.g., via a security camera) to an audience presentation. Additionally or alternatively, surrounding audience data may include MAC presence or id broadcast data received from IoT devices. Additionally or alternatively, surrounding audience data may include mobile device data (e.g., smart badge data, mobile phone data, etc.) received from mobile communication devices utilized by audience members.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or presentation device 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate preventing sensitive information exposure based on a surrounding audience. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include data storage 120. Data storage 120 generally represents any type or form of storage space in system. In one example, data storage 120 may include storage space for surrounding audience data 122, audience profile 124, and information exposure policy 126.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a presentation device 206 via a network 204. In one example, all or a portion of the functionality of modules 102 may be performed by computing device 202, presentation device 206, and/or any other suitable computing system. As will be described in greater detail below, one or more of modules 102 from FIG. 1 may, when executed by at least one processor of computing device 202 and/or presentation device 206, enable computing device 202 and/or presentation device 206 to prevent sensitive information exposure based on a surrounding audience. For example, and as will be described in greater detail below, one or more of modules 102 may cause computing device 202 and/or presentation device 206 to detect, from one or more communication devices 208, surrounding audience data 122 associated with an audience presentation 214 on presentation device 206, the audience presentation 214 including sensitive information 216 and non-sensitive information 218, (2) determine an audience profile 124, based on surrounding audience data 122, that identifies one or more unintended audience members in a surrounding audience 224, (3) assign information exposure policy 126 to audience presentation 214 based on audience profile 124, and (4) perform a security action to enforce information exposure policy 126 on presentation device 206 such that sensitive information 216 is prevented from being exposed to surrounding audience 224 during audience presentation 214.

Computing device 202 generally represents any type or form of computing device capable of reading computer-executable instructions. For example, computing device 202 may be an endpoint device running client-side data loss prevention (DLP) and/or parental control software and enforcing DLP and/or parental control policies. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Presentation device 206 generally represents any type or form of computing device that is capable of reading computer-executable instructions. For example, presentation device 206 may be an endpoint device capable of running client-side slide presentation software and displaying associated presentation information. Additionally or alternatively, presentation device 206 may be a display device (e.g., a television or mobile electronic device) capable of displaying broadcast video signals and/or video programming or other information. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Communication devices 208 generally represent any type or form of computing device that capable of reading computer-executable instructions. For example, communication devices 208 may include one or more mobile devices 220 and/or one or more IoT devices 222, that may be used by surrounding audience 224. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and presentation device 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

In some examples, information exposure policy 126 on computing device 202 may include a data loss prevention (DLP) policy 210 and/or a parental control policy 212. In some examples, audience presentation 214 on presentation device 206 may include sensitive information 216 and non-sensitive information 218. In some examples, presentation device 206 may additionally be configured to display a notification 221 and a map 223. In some examples, notification 221 may be displayed on presentation device 206 to notify a presenter that audience presentation 214 contains sensitive information 216 which should not be seen and map 223 may show members of surrounding audience 224 outside a proximity of presentation device 206 who may not be authorized to view sensitive information 216.

Figure 3:
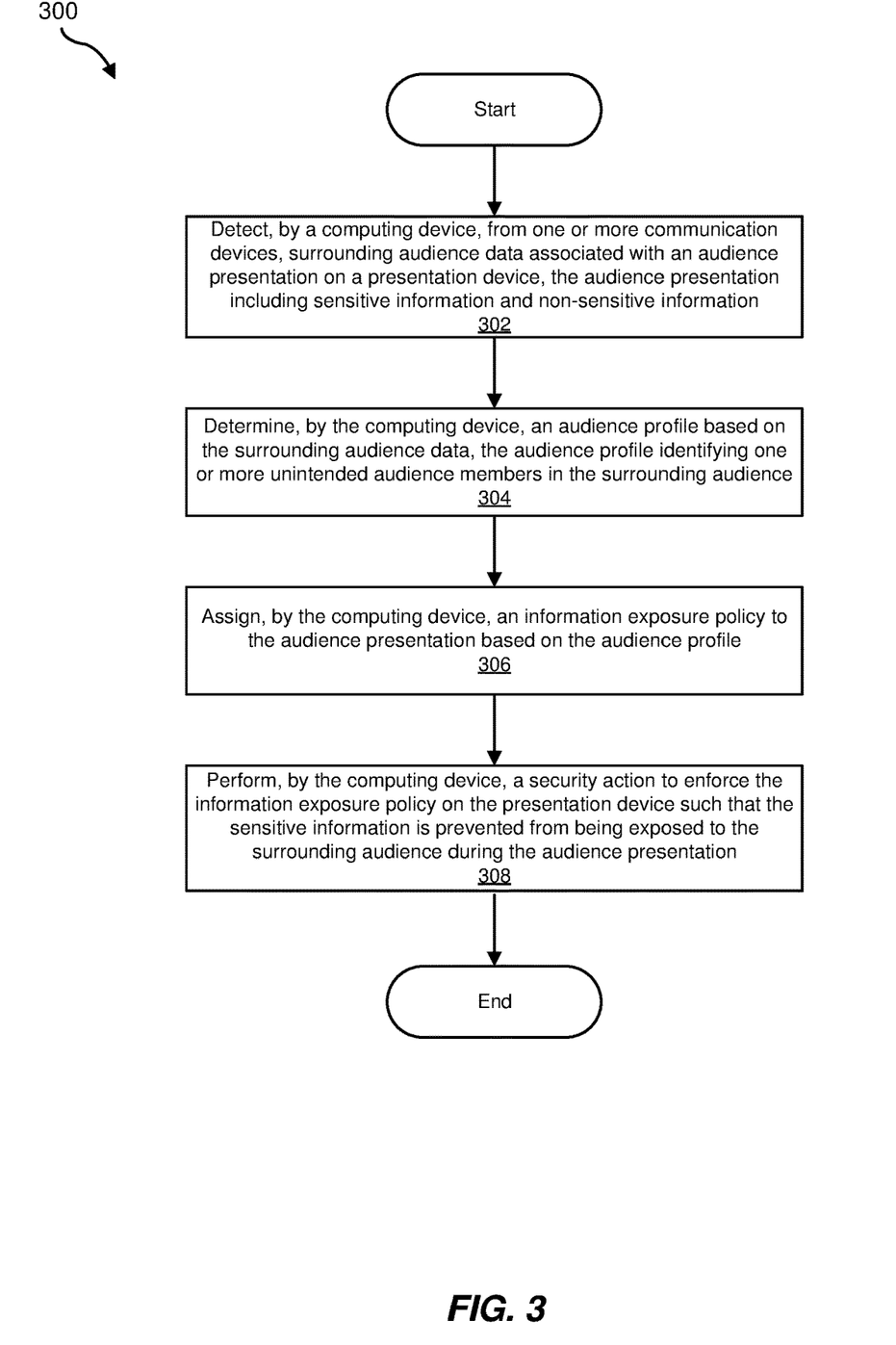
FIG. 3 is a flow diagram of an example method for preventing sensitive information exposure based on a surrounding audience.

FIG. 3 is a flow diagram of an example computer-implemented method 300 for preventing sensitive information exposure based on a surrounding audience. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may detect, by a computing device, from one or more communication devices, surrounding audience data associated with an audience presentation on a presentation device, the audience presentation including sensitive information and non-sensitive information. For example, detection module 104 may, as part of computing device 202 in FIG. 2, detect surrounding audience data 122 from communication devices 208. In some examples, surrounding audience data 122 may be associated with audience presentation 214 on presentation device 206 and include sensitive information 216 and non-sensitive information 218.

Detection module 104 may surrounding audience data 122 in a variety of ways. For example, as shown in system 400 of FIG. 4, detection module 104 may detect facial recognition data 402, voice detection data 404, and/or communication device data 406 from cameras and/or microphones in a meeting room where audience presentation 214 is being held for identifying members of surrounding audience 224. In some examples, surrounding audience 224 may include audience members who are outside of a meeting room where a presentation is held but who may still be capable of viewing audience presentation 214. For example, a company security vendor may have personnel monitoring a security camera placed in a meeting room where audience presentation 214 is being held from a remote location.

At step 304, one or more of the systems described herein may determine, by the computing device, an audience profile based on the surrounding audience data, the audience profile identifying one or more unintended audience members in the surrounding audience. For example, determining module 106 may, as part of computing device 202 in FIG. 2, determine audience profile 124 (based on surrounding audience data 122) identifying one or more unintended audience members (i.e., audience members not authorized to view sensitive information 216) in surrounding audience 224.

Determining module 106 may determine audience profile 124 in a variety of ways. For example, determining module 106 may identify one or more categories associated with surrounding audience data 122 and then determine audience profile 124 based on the categories.

Figure 4:
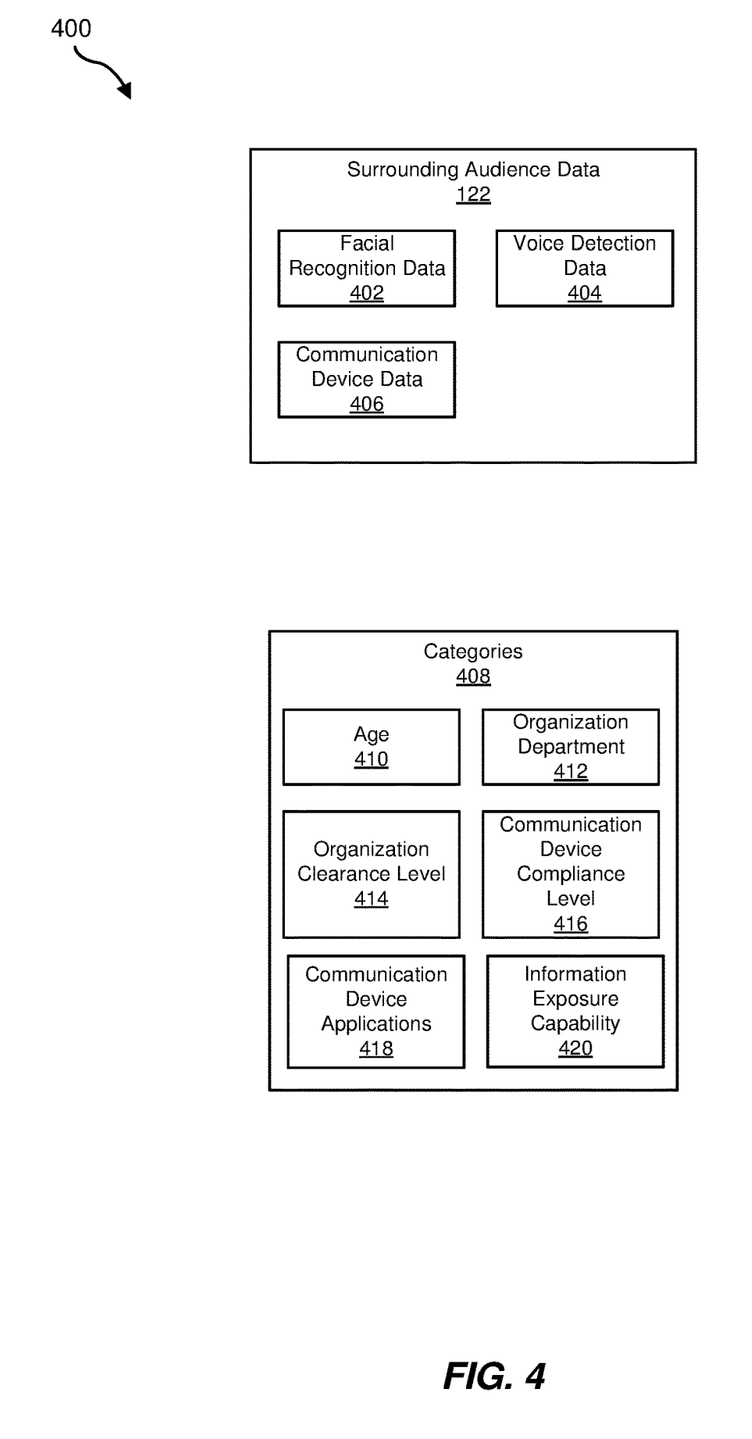
FIG. 4 is a block diagram of surrounding audience data and an audience profile in an example system for preventing sensitive information exposure based on a surrounding audience.

For example, system 400 of FIG. 4 shows various categories 408 that may be used to determine audience profile 124. Categories 408 may include, without limitation, an age category 410 (e.g., minor or adult), an organization department category 412 (e.g., which department in an enterprise does each audience member belong to), an organization clearance level category 414 (e.g., which department in an enterprise does each audience member belong), a communication device compliance level 416 (e.g., which mobile device (company or personal) is each audience member using), a communication device applications category 418 (e.g., which applications (suspicious/eavesdropping applications)), and/or an information exposure capability category 420 (e.g., which IoT devices (camera and video devices, microphones, etc.) have access to the environment in which audience presentation 214 is being held).

Returning now to step 304 of FIG. 3, determining module 106 may identify, for each surrounding audience member, a category 408. After categories 408 have been identified, determining module 106 may then compare surrounding audience data 122 to each category and determine any unintended members. For example, if based on facial recognition data 402 and/or voice detection data 404, a member of surrounding audience 224 falls into an age group for a child, audience profile 124 may identify the audience member as an unintended audience member when sensitive information 216 in audience presentation 214 contains adult content. As another example, if based on communication device data 406, a member of surrounding audience 224 lacks a minimum organization clearance level, does not belong to an organization department, and/or has a noncompliant mobile device (e.g., a personal phone instead of a company phone), audience profile 124 may identify the audience member as an unintended audience member when sensitive information 216 in audience presentation 214 includes company information.

In some examples, determining module 106 may update audience profile 124 based on new surrounding audience data. For example, determining module 106 may receive new surrounding audience data, determine a change in audience profile 124 based on the new surrounding audience data, and update information exposure policy 126 based on the change in audience profile 124. Thus, based on the new surrounding audience data (e.g., a previously identified food delivery person has left a meeting room for a company board meeting), determining module 106 may determine a change in audience profile 124 (i.e., no unintended audience members are presently in surrounding audience 224) and further update information exposure policy 126 to indicate that no security action needs to be taken with respect to sensitive information 216 in audience presentation 214.

At step 306, one or more of the systems described herein may assign, by the computing device, an information exposure policy to the audience presentation based on the audience profile. For example, assignment module 108 may, as part of computing device 202 in FIG. 2, assign information exposure policy 126 to audience presentation 214 based on audience profile 124.

Assignment module 108 may assign information exposure policy 126 to audience presentation 214 in a variety of ways. For example, assignment module 108 may assign DLP policy 210 that may be defined for a document associated with audience presentation 214 to prevent the exposure of sensitive information 216 to unintended audience members identified in audience profile 124. Additionally or alternatively, assignment module 108 may assign parental control policy 212 that may be defined for age-based content associated with the audience presentation 214 to prevent the exposure of age-inappropriate content in sensitive information 216 to unintended audience members identified in audience profile 124.

At step 308, one or more of the systems described herein may perform, by the computing device, a security action to enforce the information exposure policy on the presentation device such that the sensitive information is prevented from being exposed to the surrounding audience during the audience presentation. For example, security module 110 may, as part of computing device 202 in FIG. 2, perform a security action to enforce information exposure policy 126 on presentation device 206.

Security module 110 may enforce information exposure policy 126 in a variety of ways. For example, security module 110 may obscure sensitive information 216 (e.g., by blurring a section of a document and/or age inappropriate content) in audience presentation 214 to prevent sensitive information 216 from being exposed to unintended audience members in surrounding audience 224. Additionally or alternatively, security module 110 may suppress sensitive information 216 (e.g., an e-mail or chat notification) during audience presentation 214 by preventing the display of sensitive information 216 to unintended audience members in surrounding audience 224. In one example, security module 110 may suppress sensitive information 216 and/or the entirety of audience presentation 214 based on a predetermined geo-fence. In this example, security module 110 may display notification 221 on presentation device 206 directed to the presenter of audience presentation 214, generate a map showing members of surrounding audience 224 outside a proximity (e.g., a geo-fence perimeter) of the presentation device, and prevent sensitive information 216 and/or the entirety of audience presentation 214 from being displayed by presentation device 206.

Figure 5:
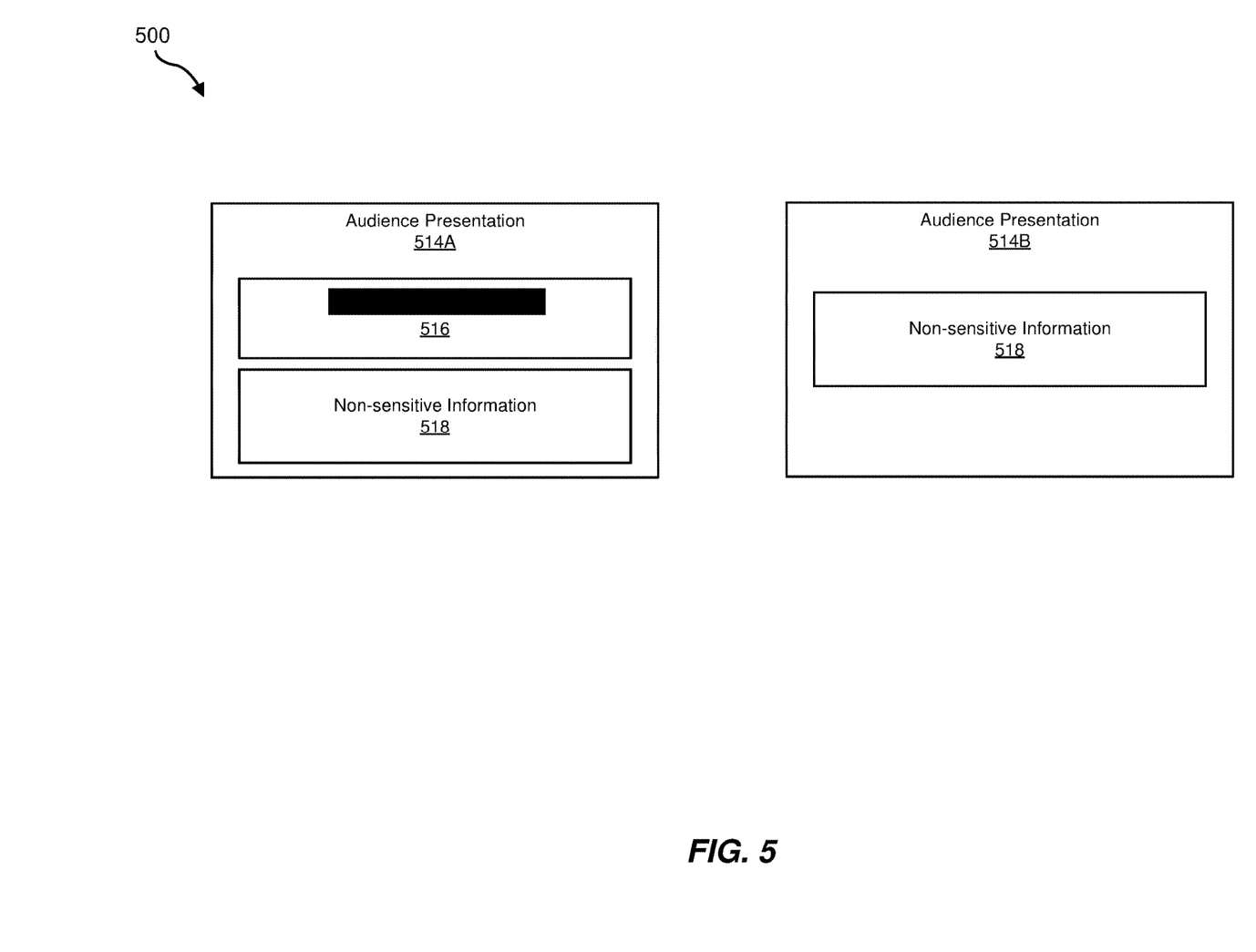
FIG. 5 is a block diagram of an information exposure policy being applied to sensitive information in an example system for preventing sensitive information exposure based on a surrounding audience.

FIG. 5 is a block diagram 500 of an information exposure policy being applied to sensitive information in an example system for preventing sensitive information exposure based on a surrounding audience For example, as discussed above in the description of FIG. 3, security module 110 may perform a security action to enforce information exposure policy 126 on presentation device 206 such that sensitive information is prevented from being exposed to surrounding audience 224 during an audience presentation.

In some examples, the sensitive information may visually obscured in an audience presentation. For example, in audience presentation 514A, sensitive information 516 may be blacked out by security module 110 leaving only non-sensitive information 518 for viewing when surrounding audience 224 contains one or more unintended audience members. In other examples, the sensitive information may be suppressed from an audience presentation. For example, in audience presentation 514B, security module 110 may suppress sensitive information from being displayed leaving only non-sensitive information 218 on presentation device 206 for viewing when surrounding audience 224 contains one or more unintended audience members.

As explained above in connection with example method 300 in FIG. 3 above, the systems and methods described herein may prevent the exposure of sensitive information during a presentation by utilizing a DLP and/or parental control service to detect a surrounding audience using connected computing devices (e.g., mobile phones, tablets, etc.) and/or surrounding IoT devices (e.g., cameras, virtual assistants, voice command devices, home automation devices, etc.) associated with audience members. The detected device data may then be used to build a profile identifying unintended audience members for which an information exposure policy may be applied and any sensitive information may be suppressed or blocked. Since traditional systems enforce information exposure policies (e.g., DLP policies) only after sensitive material has been transferred from an enterprise computing system, they may not identify and subsequently enforce these policies when the sensitive material is being shared to a live audience. By identifying members of a surrounding audience during a presentation in which sensitive information may be disclosed, the systems and methods described herein may proactively enforce an information exposure policy to prevent the leaking of the sensitive information to unintended audience members.

Figure 6:
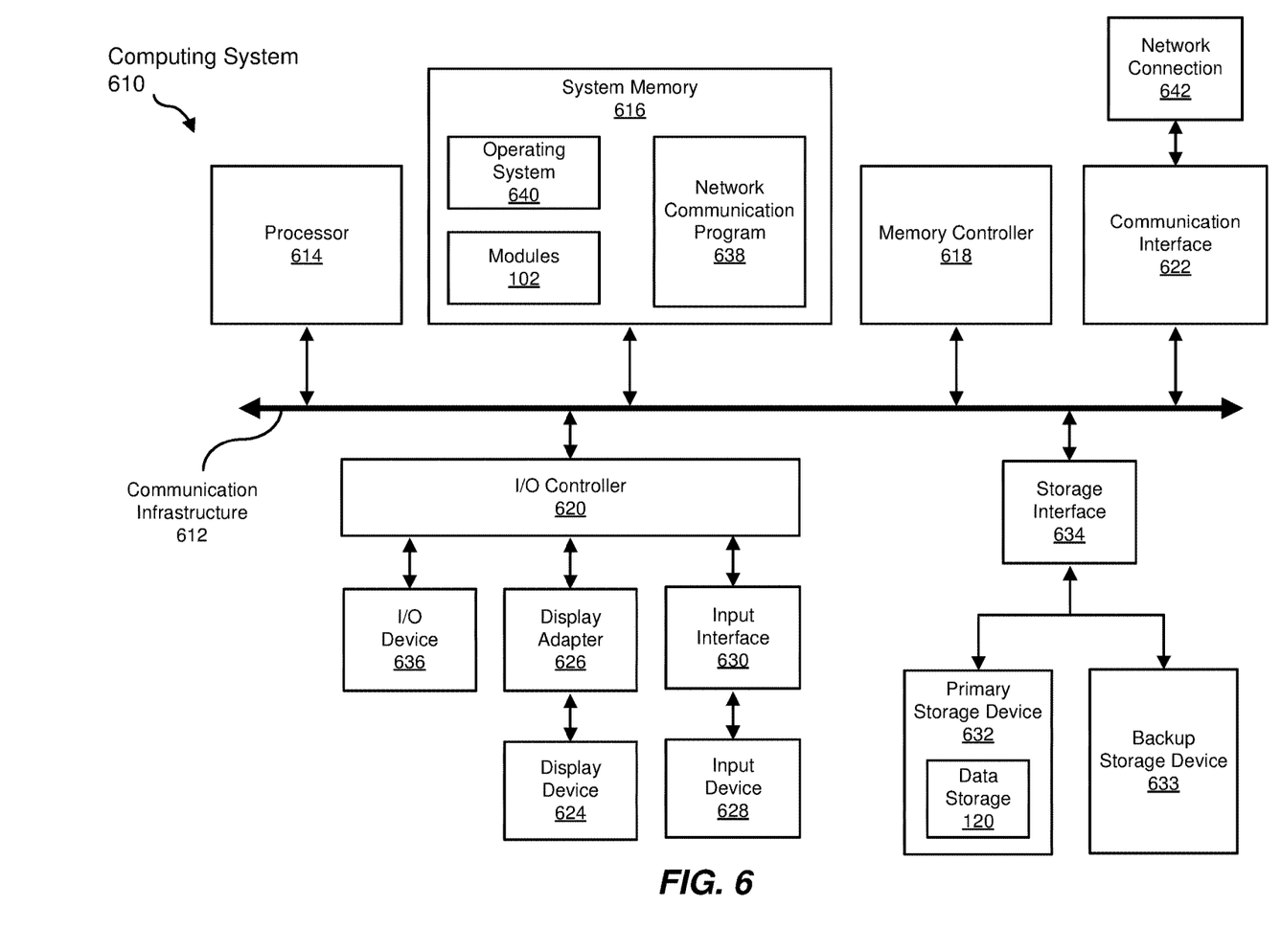
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, [data storage 120] from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
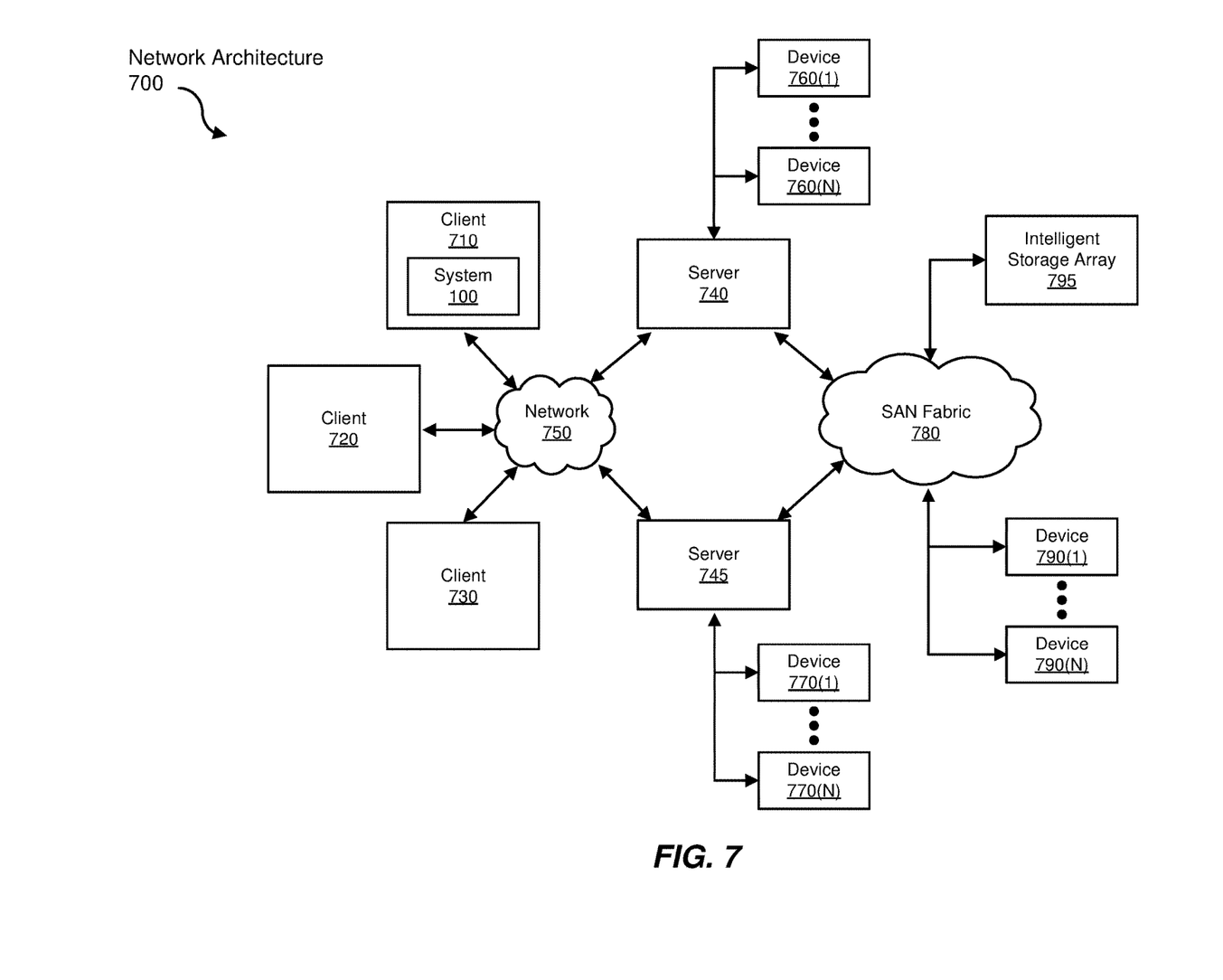
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for preventing sensitive information exposure based on a surrounding audience.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing sensitive information exposure based on a surrounding audience, at least a portion of the method being performed by a computing device comprising at least one processor, the method comprising:
   detecting, by the computing device, from one or more communication devices, surrounding audience data associated with an audience presentation on a presentation device, the audience presentation including sensitive information and non-sensitive information;
   determining, by the computing device, an audience profile based on the surrounding audience data, the audience profile identifying one or more unintended audience members in the surrounding audience;
   assigning, by the computing device, an information exposure policy to the audience presentation based on the audience profile; and
   performing, by the computing device, a security action to enforce the information exposure policy on the presentation device such that the sensitive information is prevented from being exposed to the surrounding audience during the audience presentation, wherein performing the security action comprises suppressing the sensitive information and wherein suppressing the sensitive information comprises:
      receiving, during the audience presentation, a notification of a message comprising the sensitive information directed to a presenter of the audience presentation on the presentation device; and
      preventing the message from being displayed by the presentation device to the unintended audience members in the surrounding audience during the audience presentation.

2. The computer-implemented method of claim 1, further comprising:
   receiving new surrounding audience data;
   determining a change in the audience profile based on the new surrounding audience data; and
   updating the information exposure policy based on the change in the audience profile.

3. The computer-implemented method of claim 1, wherein detecting, by the computing device, from the one or more communication devices, the surrounding audience data associated with the audience presentation on the presentation device, the audience presentation including the sensitive information and the non-sensitive information, comprises detecting at least one of:
   facial recognition data;
   voice detection data; and
   communication device data.

4. The computer-implemented method of claim 1, wherein determining, by the computing device, the audience profile based on the surrounding audience data, the audience profile identifying one or more unintended audience members in the surrounding audience, comprises:

identifying one or more categories associated with the surrounding audience data; and determining the audience profile based on the categories.

5. The computer-implemented method of claim 4, wherein the categories comprise at least one of:
   an age category;
   an organization department category;
   an organization clearance level category;
   a communication device compliance level category;
   a communication device application category; and
   an information exposure capability category.

6. The computer-implemented method of claim 1, wherein performing the security action comprises obscuring the sensitive information.

7. The computer-implemented method of claim 1, wherein suppressing the sensitive information further comprises:
   generating a map showing members of the surrounding audience outside a proximity of the presentation device; and
   preventing the audience presentation from being displayed by the presentation device.

8. The computer-implemented method of claim 1, wherein suppressing the sensitive information further comprises displaying only the non-sensitive information during the audience presentation.

9. The computer-implemented method of claim 1, wherein the information exposure policy comprises at least one of:
   a data loss prevention policy defined for a document associated with the audience presentation; and
   a parental control policy defined for age-based content associated with the audience presentation.

10. The computer-implemented method of claim 1, wherein preventing the message from being displayed by the presentation device to the unintended audience members in the surrounding audience during the audience presentation comprises:
    generating a map showing members of the surrounding audience outside of a geo-fence perimeter of the presentation device; and
    preventing the message and an entirety of the audience presentation from being displayed by the presentation device to the surrounding audience outside of the geo-fence perimeter, wherein the surrounding audience outside of the geo-fence perimeter comprises the unintended audience members.

11. The computer-implemented method of claim 10, further comprising:
    preventing the message from being displayed by the presentation device to the surrounding audience inside of the geo-fence perimeter; and
    displaying only the non-sensitive information to the surrounding audience inside of the geo-fence perimeter during the audience presentation.

12. A system for preventing sensitive information exposure based on a surrounding audience, the system comprising:
    a detection module, stored in memory, that detects from one or more communication devices, surrounding audience data associated with an audience presentation on a presentation device, the surrounding audience data including sensitive information and non-sensitive information;
    a determining module, stored in the memory, that determines an audience profile based on the surrounding audience data, the audience profile identifying one or more unintended audience members in the surrounding audience;
    an assignment module, stored in the memory, that assigns an information exposure policy to the sensitive information based on the audience profile;
    a security module, stored in the memory, that performs a security action to enforce the information exposure policy on the presentation device such that the sensitive information is prevented from being exposed to the surrounding audience during the audience presentation, wherein the security action is performed by suppressing the sensitive information and wherein the sensitive information is suppressed by:
       receiving, during the audience presentation, a notification of a message comprising the sensitive information directed to a presenter of the audience presentation on the presentation device; and
       preventing the message from being displayed by the presentation device to the unintended audience members in the surrounding audience during the audience presentation; and
    at least one physical processor that executes the detection module, the determining module, the assignment module, and the security module.

13. The system of claim 12, wherein the determining module further:
    detects new surrounding audience data from the communication devices;
    determines a change in the audience profile based on the new surrounding audience data; and
    updates the information exposure policy based on the change in the audience profile.

14. The system of claim 12, wherein the detection module detects from the one or more communication devices, the surrounding audience data associated with the audience presentation on the presentation device, the surrounding audience data including the sensitive information and the non-sensitive information, by detecting at least one of:
    facial recognition data;
    voice detection data; and
    communication device data.

15. The system of claim 12, wherein the determining module determines the audience profile based on the surrounding audience data, the audience profile identifying one or more unintended audience members in the surrounding audience, by:
    identifying one or more categories associated with the surrounding audience data; and
    determining the audience profile based on the categories.

16. The system of claim 15, wherein the categories comprise at least one of:
    an age category;
    an organization department category;
    an organization clearance level category;
    a communication device compliance level category;
    a communication device application category; and
    an information exposure capability category.

17. The system of claim 12, wherein the security module performs the security action by obscuring the sensitive information.

18. The system of claim 12, wherein the security module further suppresses the sensitive information by:
    generating a map showing members of the surrounding audience outside a proximity of the presentation device; and preventing the audience presentation from being displayed by the presentation device based on the map.

19. The system of claim 12, wherein the security module further suppresses the sensitive information by displaying only the non-sensitive information during the audience presentation.

20. A non-transitory computer-readable medium comprising one or more computer-executable instructions that, when executed by at least one processor of a computing device, cause the computing device to:

detect, by the computing device, from one or more communication devices, surrounding audience data associated with an audience presentation on a presentation device, the audience presentation including sensitive information and non-sensitive information;

determine, by the computing device, an audience profile based on the surrounding audience data, the audience profile identifying one or more unintended audience members in the surrounding audience;

assign, by the computing device, an information exposure policy to the audience presentation based on the audience profile; and perform, by the computing device, a security action to enforce the information exposure policy on the presentation device such that the sensitive information is prevented from being exposed to the surrounding audience during the audience presentation, wherein the security action is performed by suppressing the sensitive information and wherein the sensitive information is suppressed by:

receiving, during the audience presentation, a notification of a message comprising the sensitive information directed to a presenter of the audience presentation on the presentation device; and preventing the message from being displayed by the presentation device to the unintended audience members in the surrounding audience during the audience presentation.

\* \* \* \* \*